United States Patent [19]
Iketani et al.

[11] Patent Number: 6,122,233
[45] Date of Patent: Sep. 19, 2000

[54] OPTICAL DISK HAVING VIRTUALLY CONSTANT WIDTH RECORDING TRACK AND OPTICAL DISK APPARATUS

[75] Inventors: Naoyasu Iketani, Tenri; Go Mori, Nara; Michinobu Mieda, Shiki-gun; Yoshiteru Murakami, Nishinomiya; Junji Hirokane; Akira Takahashi, both of Nara, all of Japan

[73] Assignee: Sharp Kabushiki Kaisha, Osaka, Japan

[21] Appl. No.: 09/015,011

[22] Filed: Jan. 28, 1998

[30] Foreign Application Priority Data

Jan. 30, 1997 [JP] Japan ................................. 9-016101

[51] Int. Cl.⁷ ........................................................ G11B 7/09
[52] U.S. Cl. .................................. 369/44.26; 369/275.4; 369/47
[58] Field of Search .............................. 369/44.26, 275.3, 369/275.4, 124, 47, 48, 58, 54

[56] References Cited

U.S. PATENT DOCUMENTS

| | | | |
|---|---|---|---|
| 5,339,301 | 8/1994 | Raaymakers et al. | 369/50 |
| 5,616,390 | 4/1997 | Miyagawa et al. | 369/275.3 |
| 5,848,050 | 12/1998 | Nagasawa et al. | 369/275.4 |
| 5,933,411 | 8/1999 | Inui et al. | 369/275.3 |

FOREIGN PATENT DOCUMENTS

| | | |
|---|---|---|
| 0745 976 A2 | 12/1996 | European Pat. Off. . |
| 5-314538 | 11/1993 | Japan . |
| 6-301976 | 10/1994 | Japan . |

*Primary Examiner*—Thang V. Tran
*Attorney, Agent, or Firm*—Dike, Bronstein, Roberts & Cushman, LLP; David G. Conlin; George W. Neuner

[57] ABSTRACT

In an optical disk, grooves and lands serving as recording tracks are provided, the grooves are shaped so as to have virtually the same width, and in a first region, the two side walls of each groove wind in accordance with address information. The first region of the groove is formed with its leading portion located at the same angular position as the leading portion of at least one of the first regions of the adjacent grooves. Moreover, the winding portions corresponding to respective bits of the address information are formed in a manner so as to synchronize to the adjacent grooves. With this arrangement, it becomes possible to easily detect address information from the grooves and lands, and consequently to obtain an information reproducing signal with high quality.

22 Claims, 11 Drawing Sheets

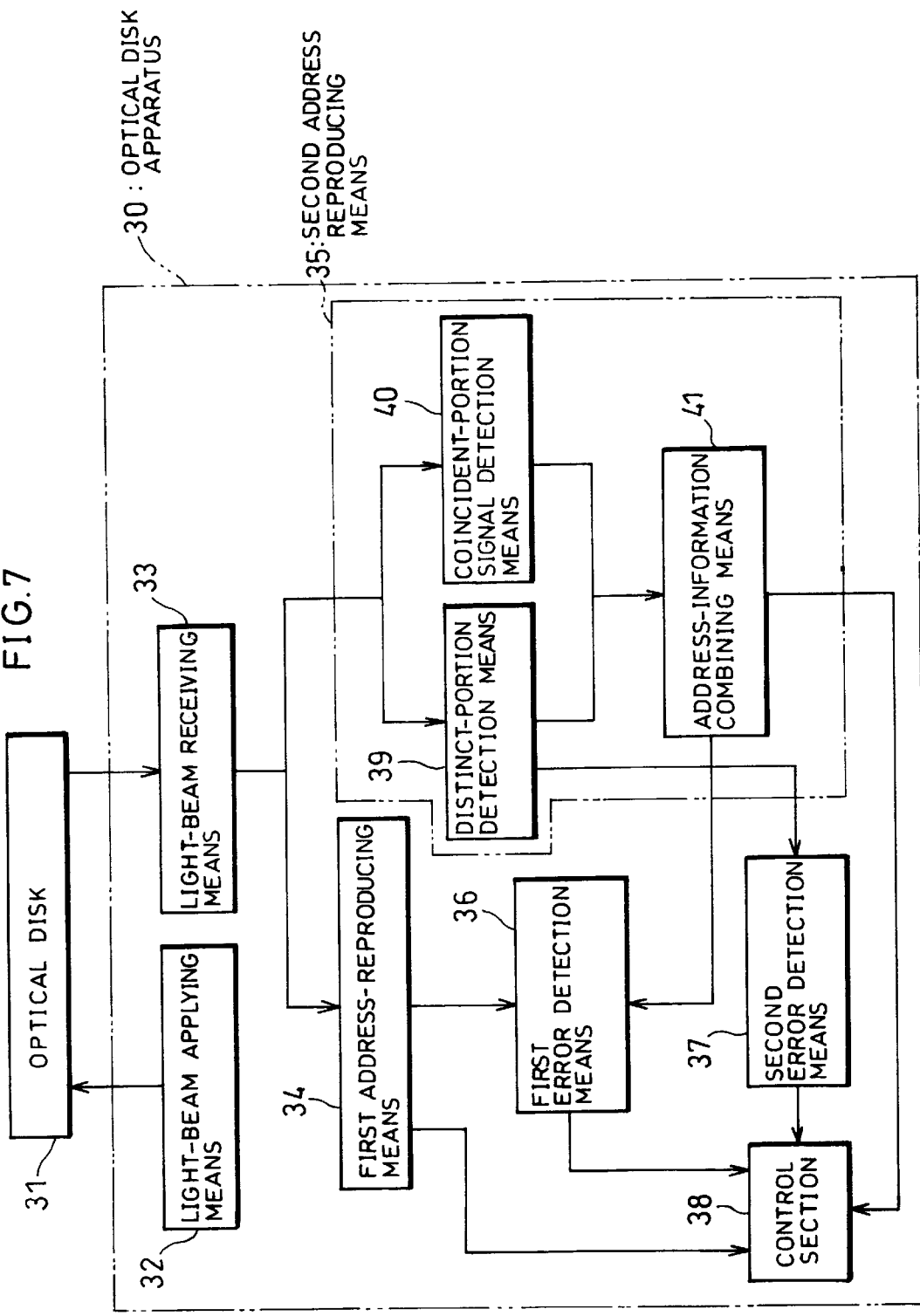

OPTICAL DISK HAVING VIRTUALLY CONSTANT WIDTH RECORDING TRACK AND OPTICAL DISK APPARATUS

FIELD OF THE INVENTION

The present invention relates to an optical disk which has tracking lands and grooves and which can record on both of the lands and grooves, and also concerns an optical disk apparatus for carrying out recording and reproducing operations on such an optical disk.

BACKGROUND OF THE INVENTION

In recent years, there have been ever-increasing demands for high-density optical disks, and in order to meet these demands a variety of recording systems have been proposed. As one of the recording systems for achieving such high-density optical disks, a land/groove recording system has been studied. The land/groove recording system is a system in which recording is made on both the lands and grooves formed on an optical disk, and in this case, it is necessary to preliminarily record address information on both the lands and grooves. For example, Japanese Laid-Open Patent Publication No. 314538/1993 (Tokukaihei 5-314538) and Japanese Laid-Open Patent Publication No. 301976/1994 (Tokukaihei 6-301976) disclose recording methods for address information in the land/groove recording system.

Referring to FIG. 14, the following description will discuss the detection system of address signals disclosed in the above-mentioned Japanese Laid-Open Patent Publication No. 314538/1993 (Tokukaihei 5-314538). On an optical disk, grooves 1 and lands 2 are formed in a spiral shape or in the shape of concentric circles, and the grooves 1 and lands 2 are designed so that the average values of the widths thereof are equal to each other, and also equal to the track pitch. Here, address information is recorded by making one of the side walls 1W of each groove 1 wind in accordance with addresses. Upon reproduction, a light spot 4, which has a diameter smaller than twofold the groove width or the land width, is used for detecting winding frequencies of the winding side wall 1W from tracking error signals so that the address information is obtained.

However, the above-mentioned detection system for address signals poses problems in which since the widths of the grooves 1 and the lands 2 vary depending on places, the reflectivity varies, thereby causing degradation in information reproducing signals; furthermore, the detection system for address signals also poses problems in which tracking offsets tend to occur in the light spot 4, thereby giving adverse effects on the reproducing signal.

Moreover, in the recording method for address information described in the above-mentioned Japanese Laid-Open Patent Publication No. 301976/1994 (Tokukaihei 6301976), the groove width and the land width are changed in accordance with address signals in an address recording area. Upon reproduction, address information is obtained by utilizing circumstances in which the total quantity of reflected light from the optical disk changes in response to the groove width or the land width.

However, since the total quantity of reflected light from the optical disk tends to be affected by variations in the quantity of laser light, variations in the groove width, a difference in reflectivity in each disk, etc., a complex system is required for preventing such adverse effects.

Furthermore, another problem with the two conventional systems is that since the widths of the lands and grooves are not constant, there is difficulty in manufacturing the disks.

SUMMARY OF THE INVENTION

The objective of the present invention is to provide an optical disk and an optical disk apparatus that can accurately read address signals in grooves and lands and can also produce high-quality information reproducing signals.

In order to achieve the above objective, the optical disk of the present invention is provided with grooves and lands which serve as recording tracks on which information is recorded, each of the grooves and lands being formed on a substrate in a manner so as to be alternately aligned in a radial direction, and being provided with an address region that is formed with a leading portion at the same angular position, each address region being provided with a winding region in which a first recording track, which corresponds to either the grooves or the lands, has two side walls that wind in accordance with address information and the width of the first recording track in the radial direction is set virtually constant.

With the above-mentioned arrangement, in the address region of the first recording track, the winding region, in which the two side walls wind in accordance with address information with a virtually constant width, is formed; therefore, the address information can be obtained, for example, by detecting tracking error signals. This makes it possible to reduce adverse effects due to external disturbance, as compared with, for example, a case in which address information is obtained by detecting the total quantity of reflected light from the optical disk.

Moreover, with the above-mentioned arrangement, since the winding region of the first recording track is designed so as to have virtually the same width, it is possible to reduce disturbance to tracking error signals due to variations in the total quantity of reflected light from the optical disk. Therefore, it becomes possible to reduce the probability that the light-converging point of a light beam on the optical disk is offset from the reproducing track, and consequently to provide an accurate reproducing signal. Furthermore, since the winding region of the first recording track is set so as to have virtually the same width, a pattern is formed by applying one pencil of laser light to the region corresponding to the first recording track, for example, in the case when grooves and lands are formed by using photoresist, which makes it possible to form the grooves and the lands easily as well as precisely.

In order to achieve the aforementioned objective, the optical disk apparatus of the present invention, which uses an optical disk that has grooves and lands which serve as recording tracks on which information is recorded, each of the grooves and lands being formed on a substrate in a manner so as to be alternately aligned in the radial direction, and provided with an address region that is formed with a leading portion at the same angular position, each address region being provided with a winding region in which a first recording track, which corresponds to either the grooves or the lands, has two side walls that wind in accordance with address information and the width of the first recording track in the radial direction is set virtually constant, is provided with: a light-beam applying means for applying a light beam to the optical disk; a light-beam receiving means for receiving an optical signal from the optical disk; and a first address-reproducing means for reproducing information in accordance with a signal from the light-beam receiving means and for detecting winding of the side walls of the first recording track by detecting a tracking error signal while the light beam is following the first recording track, so as to reproduce the address information in the first recording track.

With the above-mentioned arrangement, since the first address-reproducing means, which reproduces the address information in the first recording track by detecting winding of the side walls of the first recording track, is installed, it is possible to obtain the address information by detecting the tracking error signal. This makes it possible to reduce adverse effects due to external disturbance, as compared with, for example, a case in which address information is obtained by detecting the total quantity of reflected light from the optical disk. Moreover, since the reflected-light-quantity detection means is no longer required, it is possible to eliminate the control for reproducing address information while switching a tracking-error detection means, which is inevitably required, and the reflected-light-quantity detection means.

For a fuller understanding of the nature and advantages of the invention, reference should be made to the ensuing detailed description taken in conjunction with the accompanying drawings.

BRIEF DESCRIPTION OF THE DRAWINGS

FIG. 7 is a block diagram that shows a schematic construction of an optical disk apparatus in accordance with another embodiment of the present invention.

DESCRIPTION OF THE EMBODIMENTS
[EMBODIMENT 1]

Referring to Figures, the following description will discuss one embodiment of the present invention.

Figure 1:
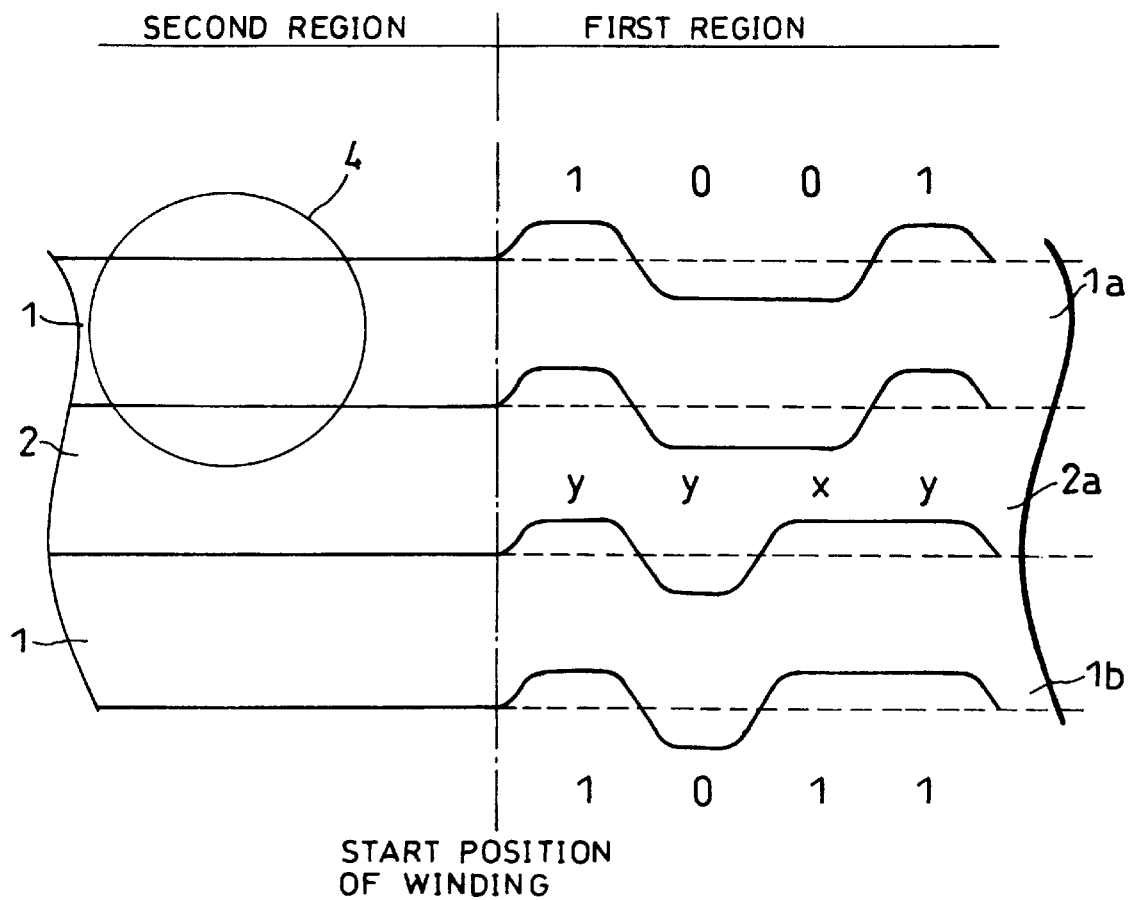
FIG. 1 is a plan view that shows one portion of a schematic construction of an optical disk in accordance with one embodiment of the present invention.
Figure 2:
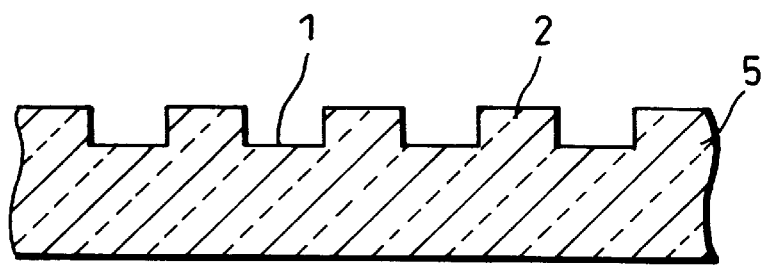
FIG. 2 is a cross-sectional view that shows the schematic construction of the optical disk.
Figure 3A:
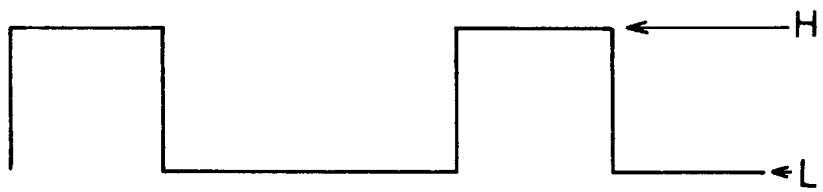
FIGS. 3(a) through 3(d) are waveform charts that show reproducing signals from the optical disk.
Figure 3B:
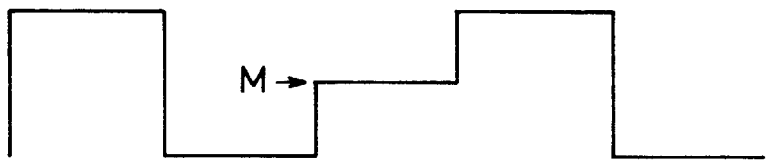
Figure 3C:
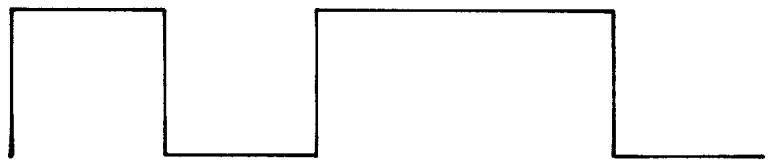
Figure 3D:

FIG. 1 is a plan view of an optical disk in accordance with the embodiment of the present invention, and FIG. 2 is a cross-sectional view of the optical disk in the radial direction. Tracking grooves 1 (first recording tracks) and lands 2 (second recording tracks) are formed on one side of an optical disk substrate 5, and the width of each land 2 is set to be virtually the same as the width of each groove 1. Further, as illustrated in FIG. 1, the optical disk substrate 5 is provided with the first region (an address region) on which address information is recorded and the second region where information is recorded, erased and reproduced. The grooves 1 are formed so as to have virtually the same width all through the first region and the second region.

In the first region, the two side walls of respective grooves 1a and 1b are set to wind in radial directions of the optical disk substrate 5 in accordance with address information. The starting position of the winding of each groove 1a, 1b is set at the same angular position as that of at least one of the adjacent grooves. For example, in the case of information recording by the ZCAV (Zoned Constant Angular Velocity) system, the starting positions in the first region of the grooves belonging to the same zone are placed on the same line segment connecting the center of the optical disk and a circumferential edge. Moreover, with respect to the adjacent grooves 1, winding portions corresponding to respective bits of the address information are formed synchronously so as to have the same angular positions. In other words, the winding portions of the side walls of the adjacent grooves 1 are formed based upon a synchronizing reference clock so that they are regarded as the same length by the address-reproducing system.

Furthermore, the frequency of the winding, detected when the winding is read, is set higher than frequencies that can be followed by the tracking servo system. Therefore, the light beam does not follow the winding of the side walls of the grooves 1, and scans virtually the center of the grooves 1 or the lands 2.

The selection as to whether the recording and reproducing light spot is allowed to follow the grooves 1 or the lands 2 is easily made by inverting the polarity of a tracking error signal. The tracking error signal is obtained by, for example, the beam method or the push-pull method.

In the above-mentioned optical disk substrate 5, the address information is read out by detecting the winding condition of the side walls of the grooves 1 and the lands 2 in the first region. Here, in order to obtain a signal capable of providing address information, the amount of amplitude of the winding is preferably set not less than ±5 nm. If the amount of amplitude is set greater, it becomes more difficult to form the winding portions although the size of the signal becomes greater. When consideration is given to ease of formation, it is preferable to set the amount of amplitude of each winding portion in the range from ±10 nm to ±50 nm.

Referring to FIG. 1, an explanation will be given more specifically of the reproducing method of address information of the present embodiment. In FIG. 1, within the first region, the first groove 1a winds in the radial direction of the optical disk substrate 5 with virtually the same width in accordance with address information that has been modulated to Gray Code corresponding to (1001). Further, the second groove 1b, which is adjacent to the first groove 1a, winds in the radial direction of the optical disk substrate 5 with virtually the same width in accordance with address information that has been modulated to Gray Code corresponding to (1011). Here, in FIG. 1, the winding directions of information (0) and (1) may be set opposite to each other.

First, with respect to the above-mentioned optical disk substrate 5, an explanation will be given of a method for reproducing address information from the grooves 1.

As described earlier, the recording and reproducing light spot 4 is scanning virtually the center position of the first groove 1a and the second groove 1b, and during this scanning process, address information is reproduced. In the first region, since the side walls of the first groove 1a and the second groove 1b are set to wind, the positional relationship between the recording and reproducing light spot 4 and the first groove 1a and the second groove 1b is changed, thereby resulting in a change in the tracking error signal. In other words, when the side walls of the first groove 1a and the second groove 1b are winding toward the inner circumferential side, the recording and reproducing light spot 4 is relatively offset toward the outer circumferential side. Therefore, the tracking error signal forms a signal indicating that the recording and reproducing light spot 4 is offset toward the outer circumferential side. Further, when the side walls of the first groove 1a and the second groove 1b are winding toward the outer circumferential side, the recording and reproducing light spot 4 is relatively offset toward the inner circumferential side. In this case, the tracking error signal forms a signal indicating that the recording and reproducing light spot 4 is offset toward the inner circumferential side. Consequently, the winding condition of the first groove 1a and the second groove 1b can be detected by monitoring the tracking error signal, thereby making it possible to reproduce the recorded address information.

FIGS. 3(*a*) and 3(*c*) are waveform charts that schematically show waveforms of the tracking error signal in the first groove 1a and the second groove 1b in FIG. 1. In response to the winding of the side walls of the first groove 1a and the second groove 1b toward the inner circumferential side or the outer circumferential side of the optical disk substrate 5, the level of the tracking error signal changes to H or L. Therefore, by detecting this change in the tracking error signal, the address information of (1001) is obtained from the first groove 1a, and the address information of (1011) is obtained from the second groove 1b.

Next, an explanation will be given of a method for reproducing address information from the lands 2. In FIG. 1, in portion y (corresponding to a coincident portion in the claims) within the first region, since the two side walls of the first land 2a wind in the same direction, the winding condition thereof can be detected in the same manner as the case of the grooves 1. However, in portion x (corresponding to a distinct portion in the claims) within the first region, since the two side walls of the first land 2a wind in different directions from each other, the behavior of the tracking error signal is different from the case of the grooves 1 in this portion x. More specifically, in portion x, since both of the two side walls wind in the directions that narrow the width of the first land 2a, the first land 2a in this portion is located at the virtually center of the recording and reproducing light spot 4. Therefore, in portion x, the tracking error signal forms a signal indicating that there is no offset.

FIG. 3(*b*) is a waveform chart that schematically shows the waveform of the tracking error signal from the first land 2a. In the portion that corresponds portion x, the level of the tracking error signal is different from portions in which the two side walls wind in the same manner, and changes to level M that is an intermediate level between the above-mentioned levels H and L. This intermediate level M can be detected by the ternary detection or other methods, thereby resulting in the detection of portion x.

In the optical disk device of the present embodiment, based upon the results of the detection of portion x, address information is reproduced from the lands 2. The following description will discuss a specific example thereof.

Upon detection of portion x in the first land 2a, supposing that the signal at portion x represents (0) or (1), this is added to the signals obtained from portion y (in FIG. 1, (10X1) in which λ is a signal at portion x), thereby providing two assumed signals (1001) and (1011). These two assumed signals always form address information of the groove 1a or the groove 1b, the two grooves adjacent to the first land 2a. Here, if it is determined that the address information of the lands 2 is identical to the address information of the groove 1 that is adjacent to the land in question on the inner circumferential side, one of the assumed signals that corresponds to the groove 1 adjacent to the first land 2a on the inner circumferential side is selected to form the address information of the first land 2a. Additionally, in the case shown in FIG. 1, the address information can be created with ease as described above since only one portion x exists; however, in the case of a plurality of portions x, more complicated processes are required.

Even if the address information of the land 2 is set to be identical to the address information of the groove 1 that is adjacent thereto as described in the above specific example, it is possible to discriminate which the light beam is scanning, the land 2 or the groove 1, based upon the polarity, etc. of the tracking error signal; therefore, it is possible to specify the track in question accurately based upon the results of the discrimination.

As described above, in the optical disk of the present embodiment, the starting position of the region for recording address information is set at the same angular position as those of the adjacent tracks, and with respect to two adjacent grooves 1, winding portions corresponding to respective bits of the address information are synchronously formed. With this arrangement, while the recording and reproducing light spot 4 is scanning a land 2, different pieces of address information that has been recorded in the two grooves located on the two sides of the land 2 can be detected; and based upon these pieces of address information, the address information of the land 2 can be reproduced. Therefore, address information can be obtained accurately from both the lands 2 and the grooves 1; and based upon this, processes, such as reproduction and recording, can be carried out.

Additionally, the reproduction of address information from the lands 1 is not intended to be limited to the above mentioned method. For example, a signal obtained by the ternary detection (for example, a signal (HLMH) in the case of FIG. 3(*b*)) may be used as a direct address signal, and based upon the ternary signal, discrimination on the track address may be carried out. Moreover, the address signal may be created based upon the location of the intermediate level M (the location of portion x).

Moreover, the detection of portion x is not intended to be limited to the above-mentioned method; for example, a total signal that is dependent on the quantity of reflected light from the optical disk may be used to detect portion x. This results from the fact that since the width of the lands 2 is virtually constant at portions other than portion x, the quantity of reflected light becomes virtually constant regardless of the presence or absence of the winding, while in portion x, the width of the lands increases or decreases, resulting in a corresponding change in the quantity of reflected light. In the case of address information as shown in FIG. 1, the total signal forms one as shown in FIG. 3 (*d*), and portion x can be detected by detecting a change therein. Therefore, without the need for the abovementioned ternary detection, the address information can be reproduced by the discrimination of H (or L) of the tracking error signal (in which L (or H) is assumed except for H (or L)) in combination with the detection of a positional change in the total signal.

Additionally, in the case of the address information shown in FIG. 1, each piece o f address information of the groove 1 is constituted by a Gray Code that is different from those of adjacent grooves 1 by only one bit. With this arrangement, portion x is allowed to exist only at one position on each of the lands 2, making the detection simpler and more accurate. Moreover, although the above-mentioned embodiment has exemplified the case in which the width of the first lands 2a, which serves as portion x, is narrowed, the width may be widened conversely.

Next, an explanation will be given of a reading-error detection method for address information in the above-mentioned optical disk.

In the case of address information as shown in FIG. 1, there is always only one portion x in each land 2. Therefore, if two or more portions x are detected, or if no portion x is detected, this can be judged as an address reading error. The error detection of this type is, of course, applied not only to a case having only one portion x, but also to a case having a predetermined number of portions x. In other words, if the number of portions x detected is different from a predetermined number, this can be judged as a reading error.

Moreover, in the case when address information of land 2 is set to be identical to that of adjacent grooves 1, if an assumed signal, obtained by assuming the signal of portion x as (0) or (1), is not identical to the address information of adjacent two grooves 1, this can be judged as an address reading error.

It is possible to improve the reliability of address information by carrying out the address reading-error detection as described above.

Further, in the optical disk apparatus of the present embodiment, it is possible to obtain accurate address information by setting the diameter of the recording and reproducing light spot 4 to be greater than the track pitch and also to be smaller than two times the track pitch.

As described above, in the optical disk and the optical disk apparatus of the present embodiment, since the address information is reproduced based upon the tracking error signal, adverse effects caused by variations in the quantity of laser light, variations in the groove width, differences in the reflectivity of respective disks, etc. can be reduced. Further, as shown in FIG. 1, since the winding shape of the grooves 1 is provided as a curved line, that is, since the winding has a shape that can be differentiated in all the portion, high-frequency noise is hardly generated upon reading out address information from the winding portion, thereby making it possible to read out the address information more positively. This feature is essential when address information is recorded only in one portion as in the case of the present embodiment.

Referring to FIGS. 4(a) through 4(e), the following description will discuss a manufacturing process of the above-mentioned optical disk 5.

Figure 4A:
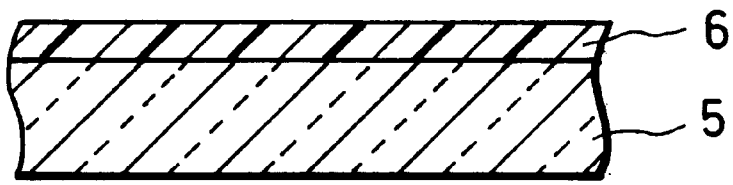
FIGS. 4(a) through 4(e) are explanatory drawings that show a manufacturing process of the optical disk.

First, photoresist 6 is applied to one surface of a glass substrate 5 as shown in FIG. 4(a).

Figure 4B:
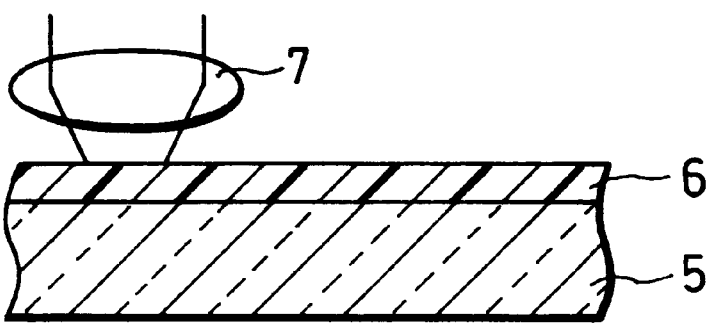

Next, as shown in FIG. 4(b), the photoresist is exposed to laser light through an objective lens 7 so as to have a desired pattern of grooves 1.

Figure 4C:
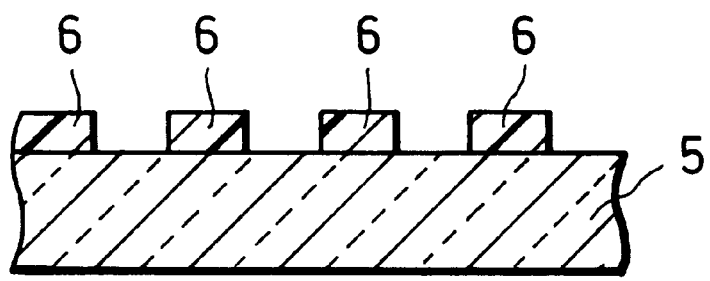

Next, as shown in FIG. 4(c), the exposed photoresist 6 is removed by development so that the desired pattern is formed by the remaining photoresist 6.

Figure 4D:
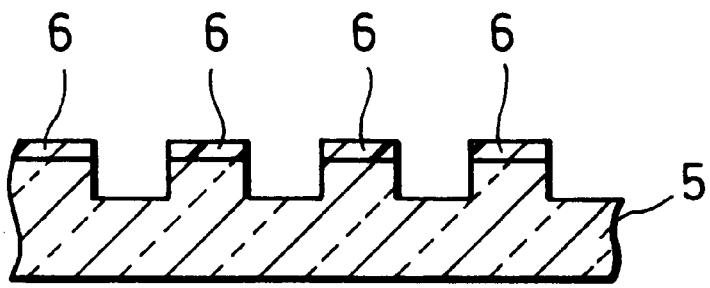

Then, as shown in FIG. 4(d), the glass substrate 5 and photoresist 6 are etched by dry etching or wet etching so that the desired pattern is formed in the glass substrate 5.

Figure 4E:
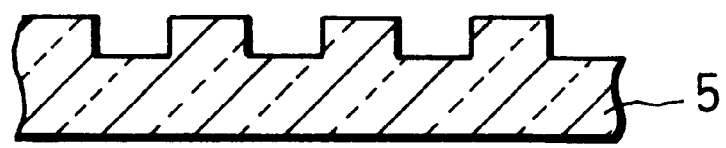

Finally, as shown in FIG. 4(e), the remaining photoresist 6 is removed by ashing.

Figure 5:
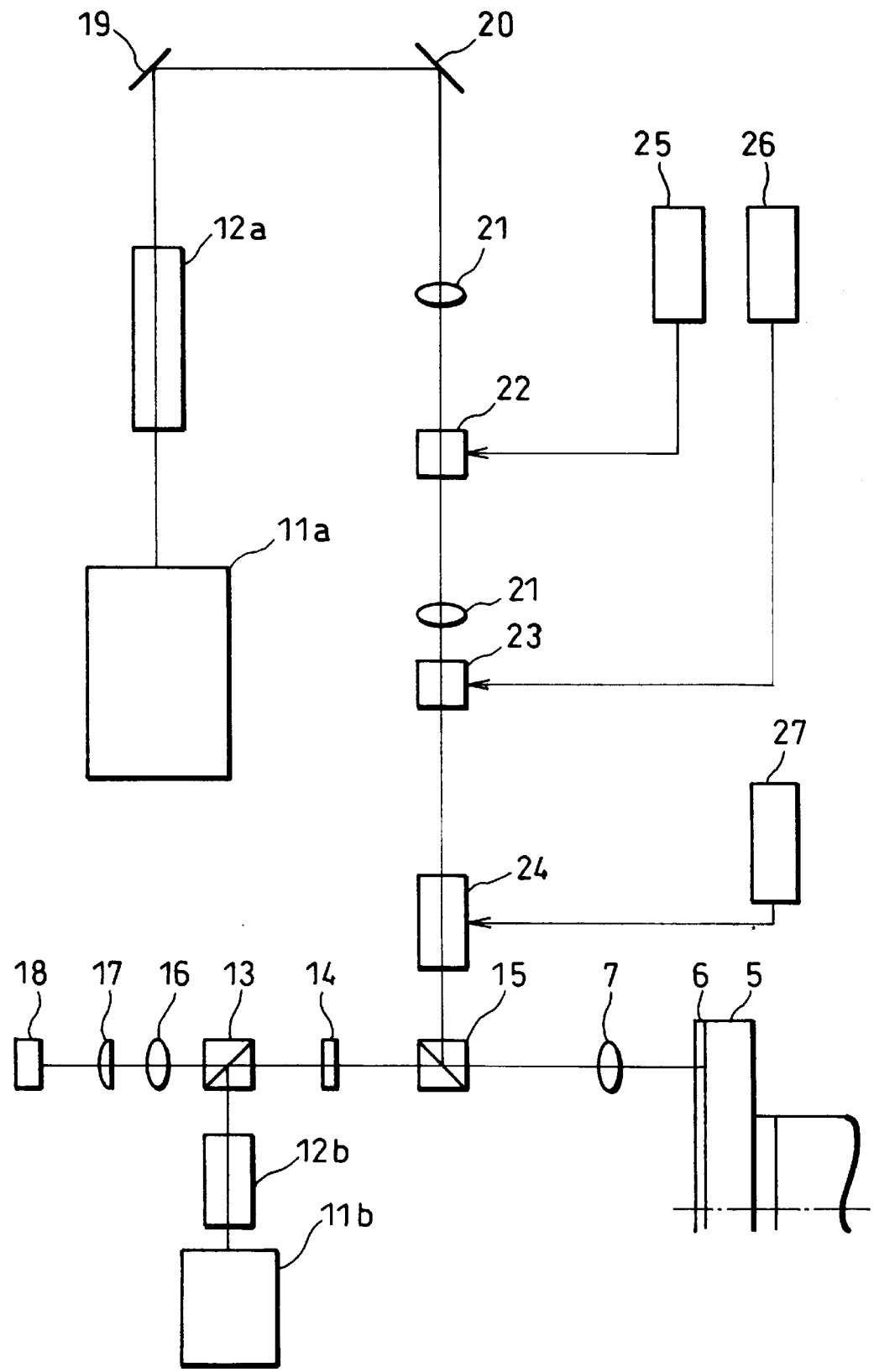
FIG. 5 is an explanatory drawing that shows a schematic construction of a manufacturing device for the optical disk.

FIG. 5 schematically shows a device for allowing the photoresist 6 to be exposed to have the pattern of the grooves 1. In this device, a laser light source 11a for exposing the photoresist 6 and a focusing laser light source 11b for the objective lens 7 are installed; and, for example, an Ar laser is used as the laser light source 11a and an He-Ne laser is used as the laser light source 11b.

The laser light from the laser light source 11a, after having been reduced in its light noise by a noise-suppressing device 12a, is reflected by mirrors 19 and 20, and is made incident on a light modulator 22. For example, an acoustic optical element may be used as the light modulator 22; and in the case of the application of the acoustic optical element, light-converging lenses 21 are placed before and after the light modulator 22.

The laser light, which has passed through the light modulator 22, is made incident on a light-deflecting device 23. For example, an electro-optical element or an acoustic optical element may be used as the light-deflecting device 23 so as to change the progressing direction of the laser light.

Further, the laser light is expanded to have an appropriate beam diameter by a beam-expander 24, and is made incident on the objective lens 7 by a dichroic mirror 15. Then, it is converged by the objective lens 7 onto photoresist 6 on the glass substrate 5 as an exposing light spot.

Here, the light modulator 22, the light-deflecting device 23 and the beam-expander 24 are respectively controlled by drivers 25, 26 and 27.

On the other hand, the laser light from the laser light source 11b, after having been reduced in its light noise by a noise-suppressing device 12b, passes through a polarizing beam splitter 13, a ¼ wave-length plate 14 and the dichroic mirror 15, and is converged by the objective lens 7 onto the photoresist 6 on the glass substrate 5.

The reflected light of the laser light from the laser light source 1ib is again converged by the objective lens 7, passes through the dichroic mirror 15, the ¼ wave-length plate 14 and the polarizing beam splitter 13, and is converged onto a photodetector 18 by an objective lens 16 and a cylindrical lens 17. Based upon a signal from the photodetector 18, a focusing servo system drives the objective lens 7 in a focusing direction so that the focusing point of the objective lens 7 is adjusted onto the photoresist 6 on the glass substrate 6 that is rotated by a spindle motor.

In the above-mentioned arrangement, the positioning of the light beam spot is first carried out. In other words, the driver 26 adjusts the size of a dc voltage that is to be applied to the light-deflecting device 23. Thereafter, in a region that is to wind in accordance with the address information of a groove 1, a voltage, which is made by superimposing a signal voltage corresponding the winding on the dc voltage, is applied to the light-deflecting device 23 by the driver 26. Thus, the region in which the groove 1 winds in accordance with the address information is formed.

Moreover, with respect to the manufacturing method, not limited to the one described in the present embodiment, two beams may be used; however, it is not limited to these manufacturing methods.

Figure 6A:
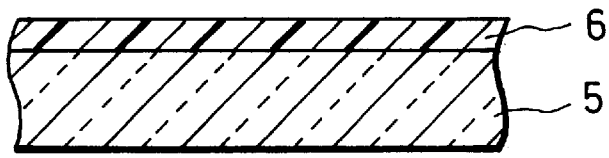
FIGS. 6(a) through 6(f) are explanatory drawings that show manufacturing processes of an optical disk in accordance with another embodiment of the present invention.

Further, with respect to the optical disk substrate 5, not limited to the one made of the glass substrate 5 as described above, it may be made of plastic resin by injection molding or injection compression molding by using a stamper manufactured through processes shown in FIGS. 6(a) through 6(f). The following description will discuss a manufacturing method of the stamper:

First, photoresist 6 is applied to one surface of a glass substrate 5 as shown in FIG. 6(a).

Figure 6B:
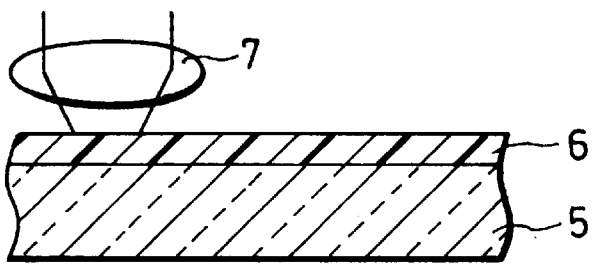

Next, as shown in FIG. 6(b), laser light is converged onto the photoresist 6 by the objective lens 7 so that the photoresist 6 is exposed so as to have a desired pattern of grooves 1.

Figure 6C:
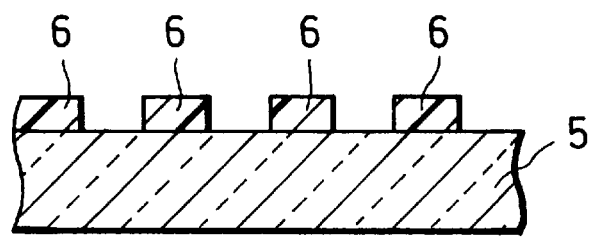

Next, as shown in FIG. 6(c), the exposed photoresist 6 is removed by development so that the desired pattern is formed by the remaining photoresist 6.

Figure 6D:
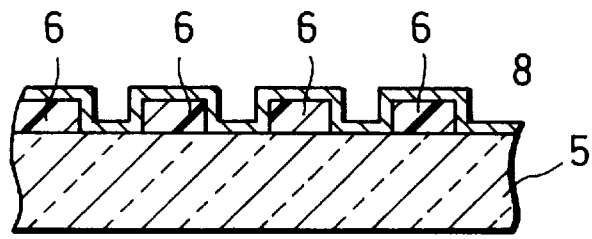

Then, as shown in FIG. 6(d), a conductive thin-film 8 is formed on the pattern made of the photoresist 6 by sputtering or electroless plating.

Figure 6E:
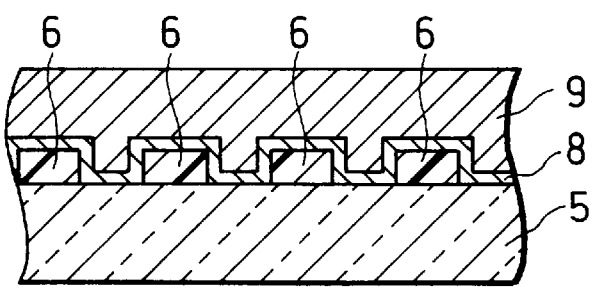

Next, as shown in FIG. 6(e), a metal layer 9 is formed on the thin-film 8 by electrocasting, etc.

Figure 6F:
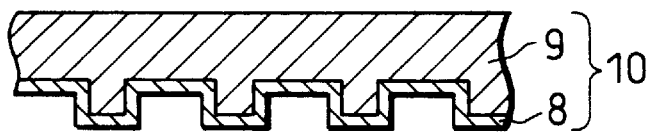

Finally, as shown in FIG. 6(f), the thin-film 8 and the metal layer 9 are separated from the glass substrate 5 and the photoresist 6 so that a stamper 10 is obtained.

Additionally, with respect to the material of the thin-film 8, Ni, Ta or Cr, or an alloy of these, or a composite film of these may be used.

The optical disk substrate 5 made of plastic is manufactured through injection molding or injection compression molding by using the stamper 10. With respect to the plastic material, thermoplastic resins, such as polycarbonate resin, acryl resin, ethylene resin, ester resin, nylon resin and APO (Activated Poly-Olefin resin), may be adopted.

Moreover, the manufacturing method of the stamper 10 of the present embodiment is not intended to be limited to the one described above, and a mask original disk, in which the side walls of grooves 1 are designed to wind in accordance with address information, may be constructed, and used so as to form the stamper 10. Furthermore, the material and the manufacturing method of the optical disk substrate 5 is not limited to those described above.

Additionally, as long as the width of either the lands or the grooves is set to be virtually constant as in the case of the optical disk of the present embodiment, a pattern can be formed on the photoresist by using merely one laser beam; consequently, it is possible to form the pattern easily in a very precise manner.

[EMBODIMENT 2]

Referring to Figures, the following description will discuss another embodiment of the present invention.

FIG. 7 is a block diagram that schematically shows a construction of an optical disk apparatus 30 used in the present embodiment. Here, an optical disk 31 where the optical disk apparatus 30 of the present embodiment carries out recording and reproducing has the same construction as the optical disk as described Embodiment 1.

The optical disk apparatus 30 is provided with: a light-beam applying means 32 for applying a light beam to the optical disk 31, a light-beam receiving means 33 for receiving optical information from the optical disk 31, a first address-reproducing means 34 for reproducing address information from grooves 1 of the optical disk 31, a second address-reproducing means 35 for reproducing address information from lands 2 of the optical disk 31, first and second error-detection means 36 and 37, and a control section 38 for carrying out actual reproducing operations and controlling operations for tracking and focusing. Moreover, the second address-reproducing means 35 is provided with a distinct-portion detection means 39, a coincident-portion signal detection means 40 and an address-information combining means 41.

First, the following description will discuss a sequence of processes that are carried out when the optical disk apparatus 30 detects address information from the grooves 1 of the optical disk 31.

A light beam is applied onto a groove 1 of the optical disk 31 from the light-beam applying means 32, and the reflected light is received by the light-beam receiving means 33. The optical information from the light-beam receiving means 33 is transmitted to the first address-reproducing means 34. The first address-reproducing means 34 detects how the groove 1 winds by detecting a tracking error signal from the output information from the light-beam receiving means 33 so that the recorded address information is reproduced. The address information is transmitted to the control section 38, and used for track-accessing control, etc.

Next, the following description will discuss a sequence of processes that are carried out when the optical disk apparatus 30 detects address information from the lands 2 of the optical disk 31.

A light beam is applied onto a land 2 of the optical disk 31 from the light-beam applying means 32, and the reflected light is received by the light-beam receiving means 33. The optical information from the light-beam receiving means 33 is transmitted to the second address-reproducing means 35. The first address-reproducing means 35 detects how the land 2 winds by detecting a tracking error signal from the output information from the light-beam receiving means 33.

At this time, the distinct-portion detection means 39 detects a distinct portion (portion x) at which the two side walls of the land 2 wind in directions different from each other. Simultaneously with this process, the coincident-portion signal detection means 40 detects a coincident-portion signal of the address information of the land 2 that is being detected, from a coincident portion (portion y) at which the two side walls of the land 2 wind in the same direction.

Then, the address-information combining means assumes that the signal obtained at the distinct portion is (0) or (1), and adds the assumed signal at the distinct portion to the above-mentioned coincident-portion signal so that two assumed signals are generated. At this time, if it is determined that the address information of the lands 2 is identical to, for example, the address information of the grooves 1 adjacent to the inner circumferential side thereof, either one of the assumed signals can be selected. The address signal thus determined is transmitted to the control section 38, and used for tracking control, etc.

Next, the following description will discuss a sequence of processes for the address-information reading-error detection that are carried out when the optical disk apparatus 30 has erroneously read out the address information from the optical disk 31.

In the optical disk 31, in the case of address information consisting of a Gray code as shown in FIG. 1, there is only one distinct portion in each land 2. Therefore, if the distinct-portion detection means 39 detects two or more distinct portions, the second error-detection means 37 makes a judgement that the address information has been erroneously read, and sends an address reading-error signal to the control section.

Moreover, in the optical disk 31, in the case when it is supposed that the address information on each land 2 is identical to address information of, for example, the groove 1 adjacent to the land 2 on its inner circumferential side, if either of the assumed signals which have been obtained by the address-information combining means 41 is not coincident with the address information of the adjacent groove 1 that has been detected by the first address-reproducing means 34, the first error-detection means 36 makes a judgement that the address information has been erroneously read, and sends the address reading-error signal to the control section 38. Additionally, such a detection of an address-information reading-error made by the first error-detection means 36 is especially effective in the case when the lands 2 and the grooves 1 are alternately scanned; and in the case when, after some of the lands 2 (or the grooves 1) have been continuously scanned, some of the grooves 1 (or the lands 2) are scanned, the detection of an address-information reading-error made by the first error-detection means 36 can be omitted.

Furthermore, in the optical disk apparatus of the present embodiment, it is possible to obtain more accurate address information by setting the diameter of the recording and reproducing light spot 4 to be greater than the track pitch and also to be smaller than two times the track pitch.

As described above, since the address information is reproduced based upon the tracking error signal, the optical disk apparatus 30 of the present embodiment is hardly susceptible to adverse effects such as variations in the quantity of laser light, variations in the groove width and differences in the reflectivity of respective disks, thereby making it possible to reproduce accurate address information. Further, it becomes possible to improve the reliability of address information by carrying out the above-mentioned address-information reading-error-detection.

[EMBODIMENT 3]

Referring to Figures, the following description will discuss still another embodiment of the present invention.

An optical disk substrate 5 that is to be used in the present embodiment has the same features, substrate materials and manufacturing processes as the optical disk substrate 5 of Embodiment 1; however, it has a different groove shape in association with address information.

Figure 8:
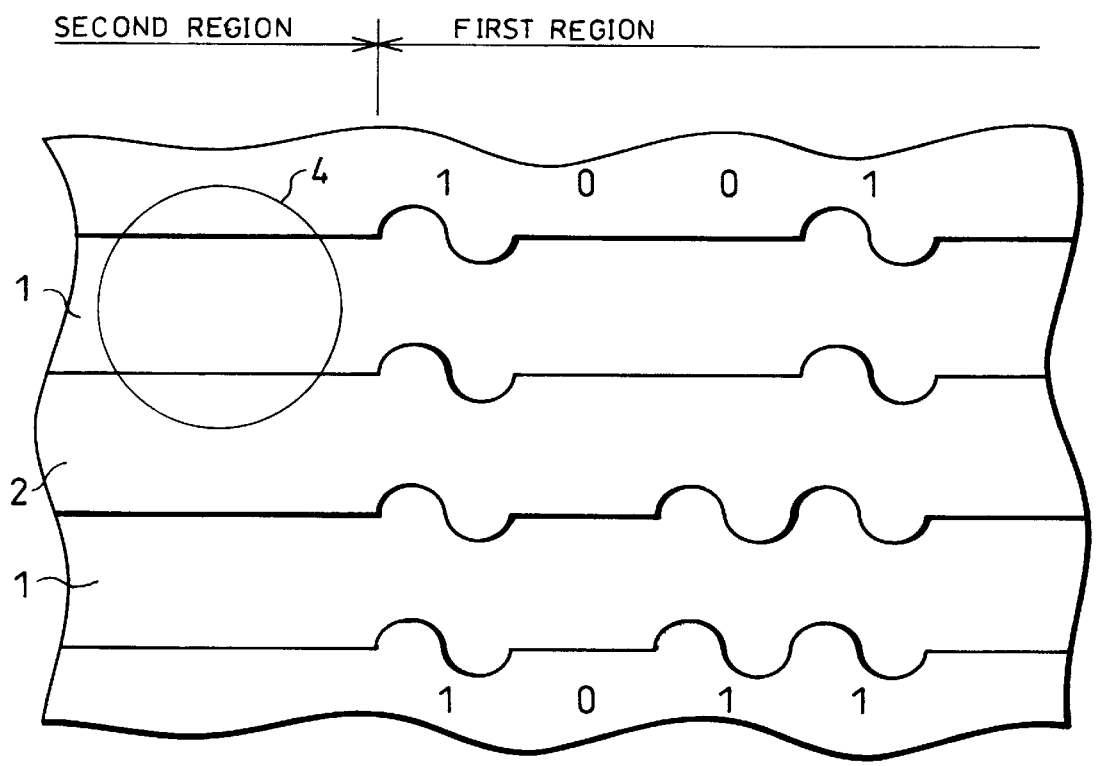
FIG. 8 is a plan view that shows one portion of a schematic construction of an optical disk in accordance with still another embodiment of the present invention.

FIG. 8 is a schematic drawing that shows a groove shape of the optical disk substrate 5 used in the present embodiment. Tracking grooves 1 and lands 2 are formed on the optical disk substrate 5. The width of each land 2 is set to be virtually the same as the width of each groove 1.

The two side walls of each groove 1 wind toward both of the inner and outer circumferential sides of the optical disk substrate 5 in accordance with address information as described in (1), and the frequency of the winding, detected when the winding is read, is set higher than frequencies that can be followed by the tracking servo system.

With this arrangement, the detection of address information from the grooves 1 with the winding side walls or from the lands 2 can be carried out in virtually the same manner as the method shown in Embodiment 1; however, in the present embodiment, address information is produced based upon a signal that is formed by differentiating a tracking error signal obtained when the recording and reproducing light spot 4 is scanning the grooves 1 or the lands 2. Here, the signal waveforms that have been differentiated have the same signal waveforms that are schematically shown in FIGS. 3(a) through 3(d).

In the above-mentioned arrangement, for example, even if the address information shown in (1) continues, the frequency of winding does not vary since one cycle of winding is repeated. In contrast, for example, in an arrangement as shown in FIG. 1, since the shape of winding is determined in accordance with address information, the frequency of the winding is not constant. In other words, in the arrangement of the present embodiment, since it is not necessary to change the winding frequency during the manufacturing process, the control mechanism of the manufacturing device can be simplified.

[EMBODIMENT 4]

Referring to Figures, the following description will discuss still another embodiment of the present invention.

An optical disk substrate 5 that is to be used in the present embodiment has the same features, substrate materials and manufacturing processes as the optical disk substrate 5 of Embodiment 1; however, it has a different groove shape in association with address information.

Figure 9:
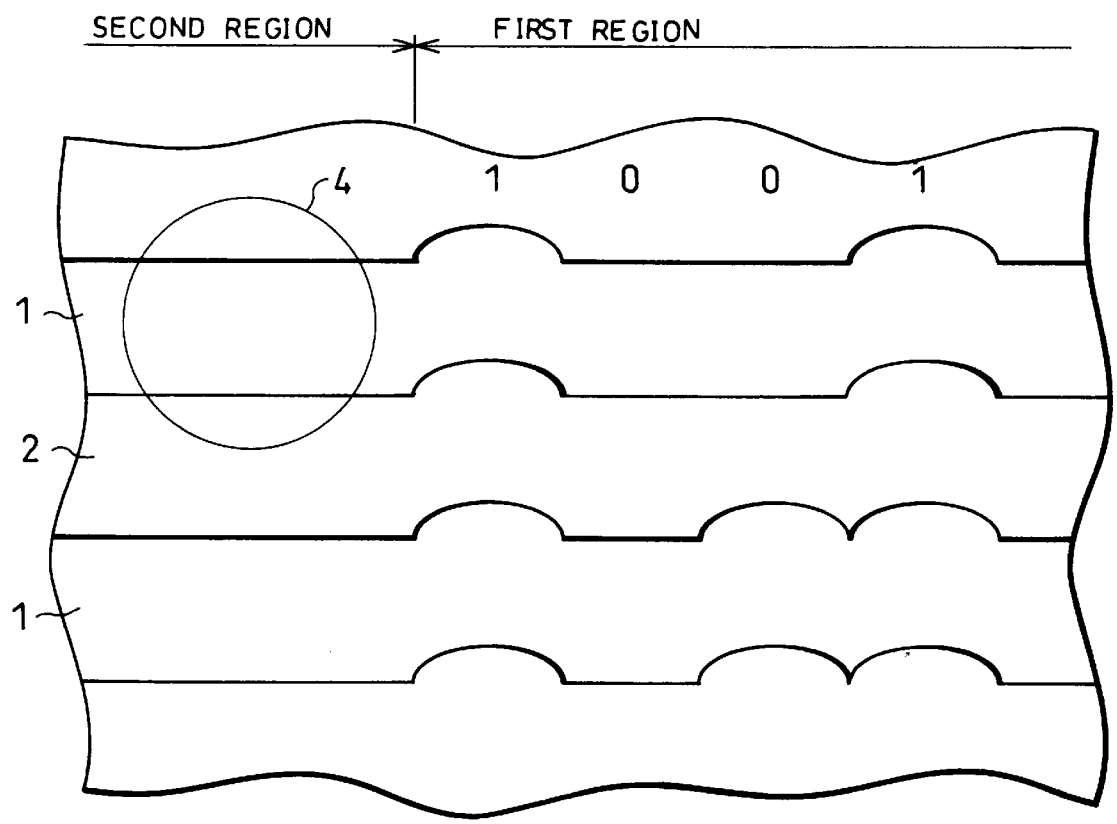
FIG. 9 is a plan view that shows one portion of a schematic construction of an optical disk in accordance with still another embodiment of the present invention.

FIG. 9 is a schematic drawing that shows a groove shape of the optical disk substrate 5 used in the present embodiment. Tracking grooves 1 and lands 2 are formed on the optical disk substrate 5. The width of each land 2 is set to be virtually the same as the width of each groove 1. Each groove 1 has a shape in which the two side walls thereof return to its straight state after having been deflected toward the inner circumferential side of the optical disk substrate 5 from its straight state in accordance with address information as shown in (1), and the frequency of the winding is set higher than frequencies that can be followed by the tracking servo system. Additionally, the two side walls of each groove 1 may be set to wind toward the outer circumferential side of the optical disk substrate 5 in accordance with address information as shown in (1).

By forming the two side walls of the grooves 1 into the winding shape shown in FIG. 9, it becomes possible to easily detect a reproducing signal. The reason for this is explained as follows:

In the present embodiment, when the two side walls of the grooves 1 are kept in a straight shape, a tracking error signal having level L corresponding to (0) in address information is detected, while a tracking error signal having level H corresponding to (1) in address information is detected when the two side walls of the grooves 1 are in a winding state toward the inner circumferential side. Moreover, in regions having no address information, the two side walls of the grooves 1 are kept in a straight state, and in this state, the tracking error signal has level L in the same manner as in the case of (0) in address information. At this time, a slice level for judging whether the tracking error signal is kept in level L or level H is set between level L and level H. Since this slice level is a level different from the level of the tracking error signal within the regions having no address information, no unwanted signals are detected in the regions having no address information.

In contrast, for example, when the two side walls of the grooves 1 are in a winding state as shown in FIG. 1, the slice level, set between level L and level H, and the level of the tracking error signal within the regions having no address information are virtually coincident with each other. Consequently, there is a possibility that unwanted signals might be detected in the regions having no address information. Therefore, it becomes necessary to eliminate such unwanted signals.

In other words, when the two side walls of the grooves 1 are formed into the winding shape shown in FIG. 9, it is not necessary to provide a process for eliminating such unwanted signals and it becomes possible to detect address signals more easily.

Moreover, in the case when the two side walls of the grooves 1 are formed into the winding shape shown in FIG. 9, for example, upon forming grooves 1 by photoresist, only one direction is required with respect to the direction in which the laser light is allowed to wind; therefore, it becomes possible to simplify the control of the laser light, etc., in the manufacturing processes.

Additionally, in the a above-mentioned embodiments 1 through 4, the winding shape of the side walls is provided as a curved shape; however, it may be provided as a rectangular shape or a trapezoidal shape.

[EMBODIMENT 5]

Refer ring to Figures, the following description will discuss still another embodiment of the present invention.

Figure 10:
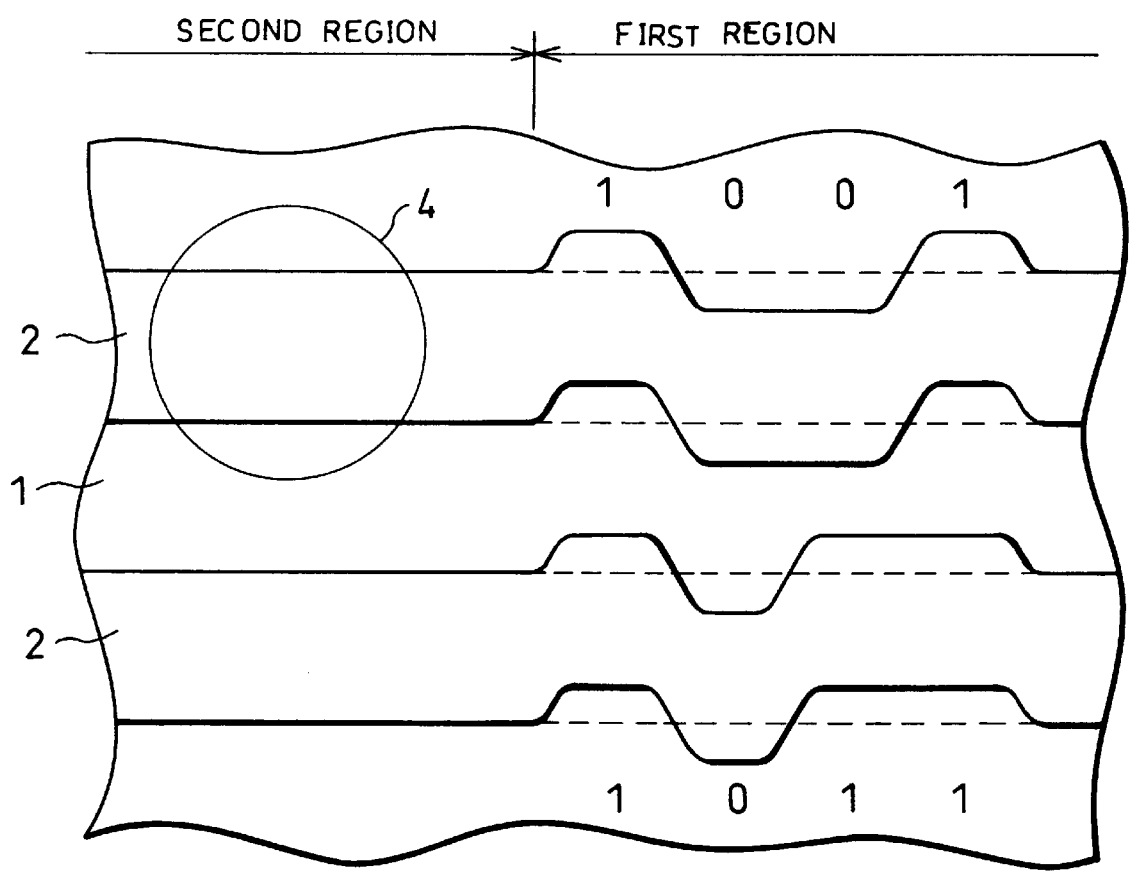
FIG. 10 is a plan view that shows one portion of a schematic construction of an optical disk in accordance with still another embodiment of the present invention.

An optical disk substrate 5 that is to be used in the present embodiment has the same features, substrate materials and manufacturing processes as the optical disk substrate 5 of Embodiments 1, 3 and 4; however, as shown in FIG. 10, it has an arrangement in grooves 1 and lands 2 that is reversed to the arrangements of Embodiments 1, 3 and 4, wherein the two side walls of the lands 2 are set to wind.

In other words, address information on the lands 2 is read as it is, while address information in the grooves 1 is reproduced in combination with the address information from the adjacent lands 2. The same reproducing method as that described in Embodiments 1 through 4 may be adopted. Additionally, the arrangement of FIG. 10 corresponds to that of FIG. 1 in Embodiment 1; however, the arrangement may correspond to that of FIG. 8 in Embodiment 3 or to that of FIG. 9 in Embodiment 4.

[Example 1 of Setting of Groove Depth]

With respect to the optical disk substrates 5 of Embodiments 1, 3, 4 and 5, an example of setting of the groove depth (land height) will be given as follows:

Supposing that the wavelength of a light beam upon recording is $\lambda$ and that the refractive index of the optical disk substrate 5 is n, the groove depth of the optical disk substrate 5 is set in the vicinity of $\lambda/6n$. In order to change the groove depth, the etching ratio may be altered, the etching conditions may be changed, the groove depth of the stamper 10 may be set in the vicinity of $\lambda/6n$, or the formation conditions may be changed.

When the groove depth of the optical disk substrate 5 is set in the vicinity of $\lambda/6n$, crosstalk, which is noise interference from adjacent track signals between tracks, can be reduced, thereby making it possible to achieve high density.

[Example 2 of Setting of Groove Depth]

With respect to the optical disk substrates 5 of Embodiments 1, 3, 4 and 5, another example of setting of the groove depth (land height) will be given as follows:

Supposing that the wavelength of a light beam upon recording is $\lambda$ and that the refractive index of the optical disk substrate 5 is n, the groove depth of the optical disk substrate 5 is set in the vicinity of $\lambda/8n$. In order to change the groove depth, the etching ratio may be altered, the etching conditions may be changed, the groove depth of the stamper 10 may be set in the vicinity of $\lambda/8n$, or the formation conditions may be changed.

This set ting of the groove depth of the optical disk substrate 5 in the vicinity of $\lambda/8n$ allows the tracking error signal to become maximum, thereby making it possible to follow tracks more stably.

[Example 3 of Setting of Groove Depth]

With respect to the optical disk substrates 5 of Embodiments 1, 3, 4 and 5, still another example of setting of the groove depth (land height) will be given as follows:

Supposing that the wavelength of a light beam upon recording is $\lambda$ and that the refractive index of the optical disk substrate 5 is n, the groove depth of the optical disk substrate 5 is set in the vicinity of $\lambda/10n$. In order to change the groove depth, the etching ratio may be altered, the etching conditions may be changed, the groove depth of the stamper 10 may be set in the vicinity of $\lambda/10n$, or the formation conditions may be changed.

This setting of the groove depth of the optical disk substrate 5 in the vicinity of $\lambda/10n$ allows the reproducing signal to become greater, thereby making it possible to obtain stable reproducing-signal characteristics.

[Example 4 of Setting of Groove Depth]

With respect to the optical disk substrates 5 of Embodiments 1, 3, 4 and 5, the other example of setting of the groove depth (land height) will be given as follows:

Supposing that the wavelength of a light beam upon recording is $\lambda$ and that the refractive index of the optical disk substrate 5 is n, the groove depth of the optical disk substrate 5 is set to not less than $\lambda/3n$. In order to change the groove depth, the etching ratio may be altered, the etching conditions may be changed, the groove depth of the stamper 10 may be set to not less than $\lambda/3n$, or the formation conditions may be changed.

This setting of the groove depth of the optical disk substrate 5 to not less than $\lambda/3n$ makes it possible to eliminate cross-erase, that is, a phenomenon in which recorded information of adjacent tracks is erroneously erased upon erasing information, even when the intensity of light-beam irradiation is high, and also to easily control the intensity control of the light beams, thereby allowing a stable erasing operation.

[Structural Example 1 of Recording Layer]

Figure 11:
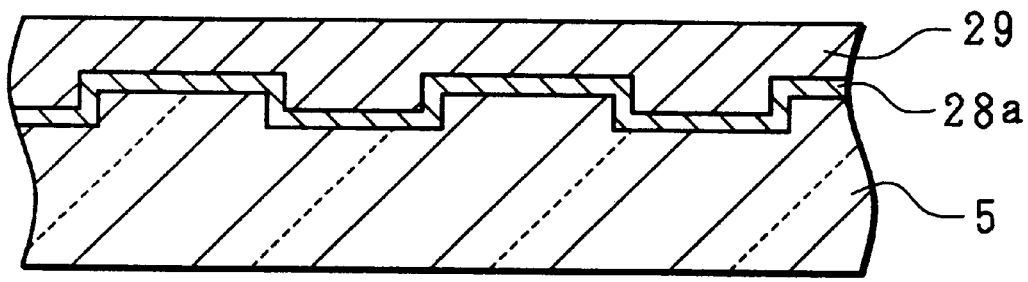
FIG. 11 is a cross-sectional view that shows a schematic construction of an optical disk in accordance with still another embodiment of the present invention.

With respect to the optical disk substrates 5 of Embodiments 1, 3, 4 and 5, one structural example of the recording layer will be given as follows:

As illustrated in FIG. 11, an optical disk of the present structural example has a structure in which a magneto-optical recording layer 28a and an overcoat layer 29 are successively formed on the optical disk substrate 5 described in Embodiment 1 and Embodiments 3 through 9. The magneto-optical recording layer 28a is constituted by a dielectric layer having a light-transmitting property, a magnetic layer, a protective layer and a reflection layer, which are not shown. The magnetic layer is made of an alloy of a rare-earth metal and a transition metal, such as, for example, DyFeCo, TbFeCo, DyTbFeCo, GdTbFe and GdTbFeCo. The magnetic layer exhibits a perpendicular magnetization characteristic from room temperature to the Curie point.

In the above-mentioned structure, the following recording processes are carried out: First, the temperature of the magnetic layer is raised to the vicinity of the Curie point by applying laser light thereto so that the magnetization of the magnetic layer becomes zero, or is allowed to invert upon application of a recording magnetic field. Then, the magnetization of the magnetic layer is aligned upward by applying an upward recording magnetic field. Thereafter, the temperature of the magnetic layer is raised to the vicinity of the Curie point by applying laser light thereto in the same manner so that the magnetization of the magnetic layer becomes zero, or is allowed to invert upon application of a recording magnetic field. Then, recording is carried out by aligning the magnetization of the magnetic layer downward by applying a recording magnetic field having an opposite direction (in this case, a downward direction).

Actually, with respect to methods for carrying out a magneto-optical recording operation, the light-modulation recording method using modulated laser light and the magnetic-field modulation method using a modulated recording magnetic field have been known.

The magneto-optical disk having the above-mentioned structure is capable of providing re-writing operations not less than 1 million times.

Additionally, the magnetic layer is not intended to be limited to a mono-layer structure, and may be provided as a multi-layer. In the case of the multi-layer film of the magnetic layer, other functions, such as an over-writing function, are added, thereby making it possible to obtain higher performances.

[Structural Example 2 of Recording Layer]

Figure 12:
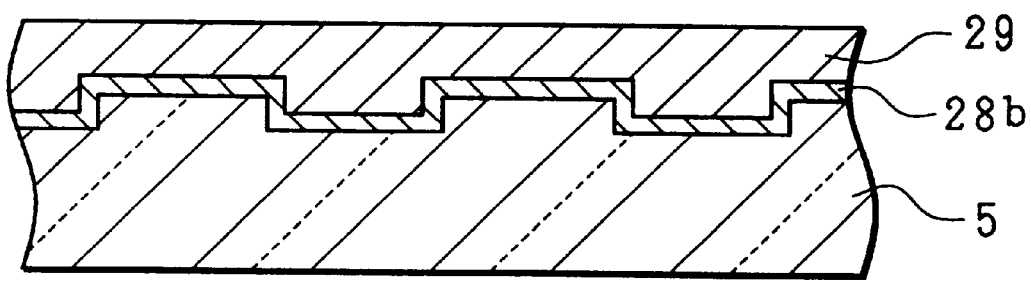
FIG. 12 is a cross-sectional view that shows a schematic construction of an optical disk in accordance with still another embodiment of the present invention.

With respect to the optical disk substrates 5 of Embodiments 1, 3, 4 and 5, one structural example of the recording layer will be given as follows:

As illustrated in FIG. 12, an optical disk of the present structural example has a structure in which a phase-change-type recording layer 28b and an overcoat layer 29 are successively formed on the optical disk substrate 5 described in Embodiment 1 and Embodiments 3 through 9. The phase-change-type recording layer 28b is constituted by a dielectric layer having a light-transmitting property, a recording layer, a protective layer and a reflection layer, which are not shown. The recording layer is made of a phase-change-type recording material, such as, for example, GeSbTe.

In the case of the above-mentioned structure, a recording operation is carried out by setting the recording layer to an amorphous state by applying high-power laser light, while setting the recording layer to a crystal state by applying low-power laser light.

The phase-change-type optical disk having the above-mentioned structure eliminates the need for applying a magnetic field, making it possible to carry out a re-writing operation by applying only laser light.

[Structural Example 3 of Recording Layer]

Figure 13:
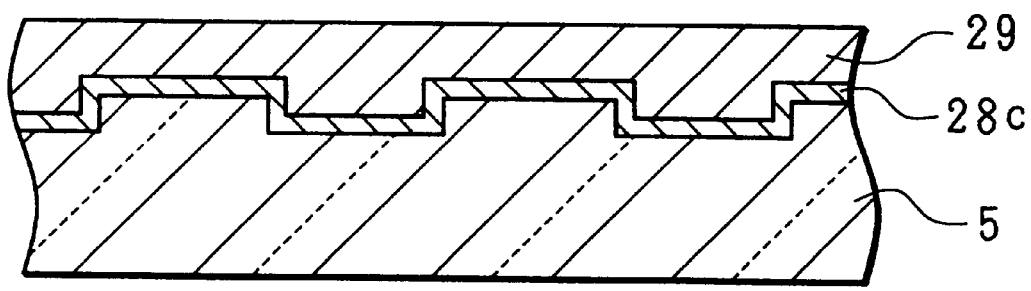
FIG. 13 is a cross-sectional view that shows a schematic construction of an optical disk in accordance with still another embodiment of the present invention.
Figure 14:
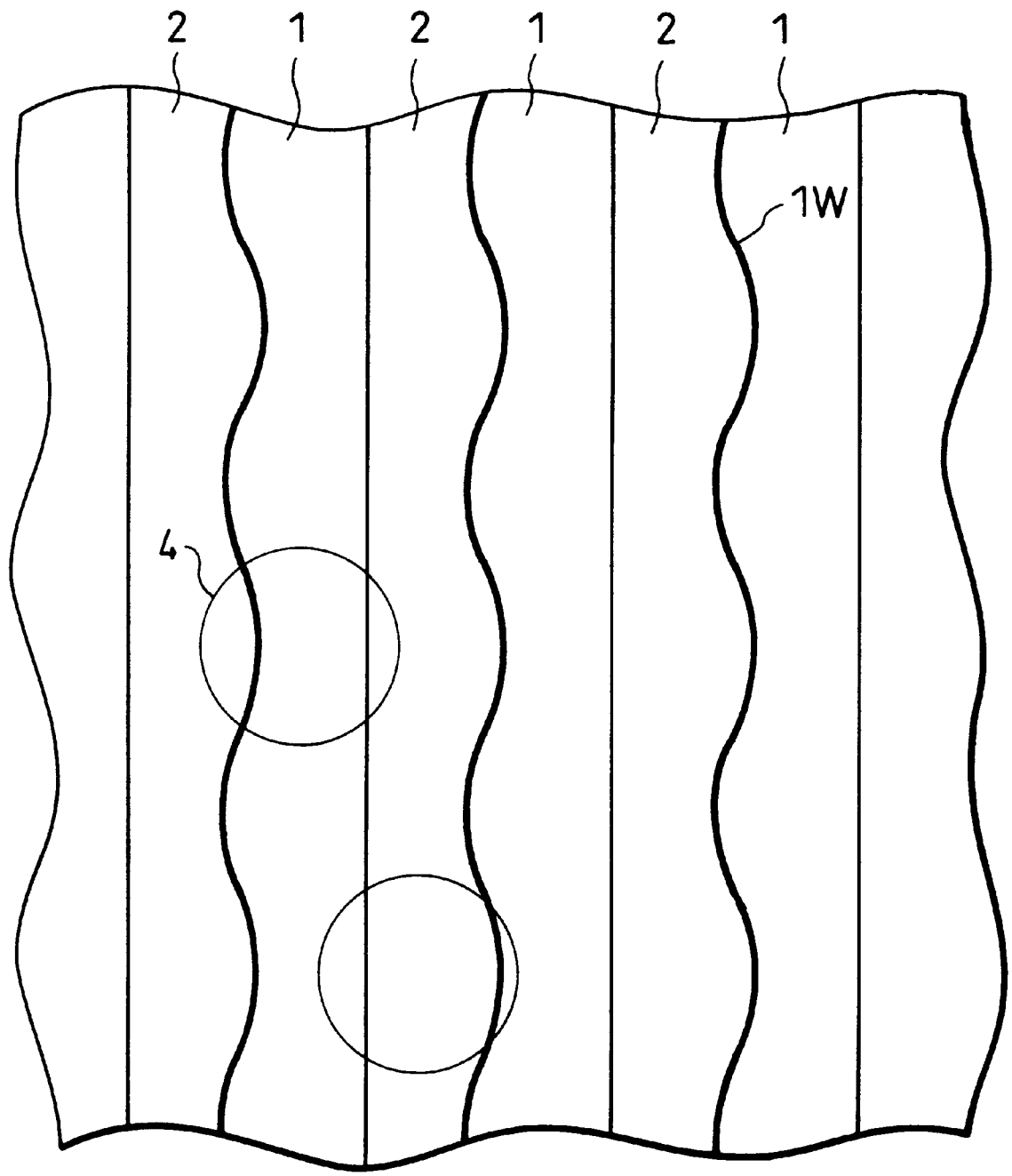
FIG. 14 is a plan view that shows one portion of a schematic construction of a conventional optical disk.

With respect to the optical disk substrates 5 of Embodiments 1, 3, 4 and 5, the other structural example of the recording layer will be given as follows:

As illustrated in FIG. 13, an optical disk of the present structural example has a structure in which a magneto-optical recording layer 28c and an overcoat layer 29 are successively formed on the optical disk substrate 5 described in Embodiments 1 through 9. The magneto-optical recording layer 28c is constituted by a dielectric layer having a light-transmitting property, a reproducing magnetic layer, a recording magnetic layer and a protective layer, which are not shown. The reproducing magnetic layer is made of an alloy of a rare-earth metal and a transition metal, such as, for example, GdFeCo and GdDyFeCo, and the recording magnetic layer is made of an alloy of a rare-earth metal and a transition metal, such as for example, DyFeCo, TbFeCo, DyTbFeCo, GdTbFe and GdTbFeCo.

The reproducing magnetic layer has such a property that it exhibits an in-plane magnetization from room temperature to a predetermined temperature, and exhibits a perpendicular magnetization at a temperature not less than the predetermined temperature. The recording layer has such a property that it exhibits a perpendicular magnetization from room temperature to the Curie point.

In the case of recording in the above-mentioned structure, the recording operation is carried out in the same manner as the recording layer described in Structural Example 1; and the reproducing operation is carried out as follows: When a light beam is applied onto the reproducing magnetic layer, the irradiated portion has a temperature distribution indicated by a Gaussian distribution so that only a region smaller than the diameter of the light beam has a temperature rise. In accordance with the temperature rise, the magnetization of the temperature-rise portion is transferred from an in-plane magnetization to a perpendicular magnetization. In other words, the direction of the magnetization of the recording magnetic layer is copied onto the reproducing magnetic layer by an exchange coupling exerted between the two layers, the reproducing magnetic layer and the recording magnetic layer. When the temperature-rise portion comes to have the perpendicular magnetization from the in-plane magnetization, only the temperature-rise portion is allowed to exhibit a magneto-optical effect so that information recorded on the recording magnetic layer is reproduced based upon reflected light from the temperature-rise portion.

When the light beam is shifted so as to reproduce the next recording bit, the previous recording portion has a temperature drop, and comes to exhibit the in-plane magnetization from the perpendicular magnetization. Accordingly, the temperature-drop portion is no longer allowed to exhibit a magneto-optical effect, with the result that the magnetization, recorded on the recording magnetic layer, is masked by the in-plane magnetization of the reproducing magnetic layer, and is no longer reproduced. Thus, it becomes possible to prevent interference of signals from adjacent bits, which causes noise.

As described above, since only the region having a temperature not less than the predetermined temperature is allowed to involve the recording operation, recording bits whose diameter is smaller than the light beam can be reproduced, thereby making it possible to improve the recording density remarkably.

Additionally, a recording layer of another type, in which a non-magnetic layer, made of a dielectric layer or a metal layer, is formed between the reproducing layer and the recording layer, and in which the reproducing magnetic layer is reproduced by using a leakage magnetic field from the recording magnetic layer upon reproduction, may be adopted. Moreover, a reflection layer may be provided between the protective layer and the optical disk substrate 5, and a protective layer for preventing the reflection layer from oxidation may also be provided between the reflection layer and the optical disk substrate 5.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk comprising:

a substrate;

recording tracks provided as grooves and lands on which information is recorded, each of the grooves and lands being formed on the substrate in a spiral shape or in the form of concentric circles;

an address region that is formed on at least one portion of each recording tracks; and a winding region in which, in the address region of a first recording track that corresponds to either the grooves or the lands, the first recording track has two side walls that wind in accordance with address information, and the width of the first recording track in the radial direction is set virtually constant, the winding region being formed with a leading portion located at the same annular position as that of the adjacent recording tracks.

2. An optical disk comprising:

grooves and lands serving as recording tracks on which information is recorded, each of the grooves and lands being formed on a substrate in a manner so as to be alternately aligned in the radial direction, and provided with an address region that is formed with a leading portion at the same angular position, wherein the address region is provided with a winding region in which a first recording track, which corresponds to either the grooves or the lands, has two side walls that wind in accordance with address information, and the width in accordance with address information, and the width of the first recording track in the radial direction is set virtually constant, the winding region being formed with a leading portion located at the same angular position as that of the adjacent recording tracks.

3. The optical disk as defined in claim 2, wherein the winding in the winding region has a curved shape.

4. The optical disk as defined in claim 2, wherein the frequency of the winding, detected when the winding is read, is set higher than frequencies that can be followed by a tracking servo system.

5. The optical disk as defined in claim 2, wherein the winding in the winding region has an amplitude that is set not less than ±5 nm.

6. The optical disk as defined in claim 2, wherein the winding in the winding region has an amplitude that is set in the range of ±10 nm to ±50 nm.

7. The optical disk as defined in claim 2, wherein in the winding region, the address information is recorded in bits and the winding portions corresponding the respective bits are formed in a manner so as to synchronize with each other between the adjacent recording tracks.

8. The optical disk as defined in claim 2, wherein supposing that the recording track that corresponds to the other of the lands and grooves is a second recording track, pieces of address information are recorded on first recording tracks that are adjacent with one of the second recording track being located in between, each piece of the address information being constituted of a Gray Code that is different by one bit.

9. The optical disk as defined in claim 2, wherein supposing that the wavelength of a light beam upon recording is $\lambda$ and that the refractive index of the substrate is n, the groove depth of the grooves is set in the vicinity of $\lambda/6n$.

10. The optical disk as defined in claim 2, wherein supposing that the wavelength of a light beam upon recording is $\lambda$ and that the refractive index of the substrate is n, the groove depth of the grooves is set in the vicinity of $\lambda/8n$.

11. The optical disk as defined in claim 2, wherein supposing that the wavelength of a light beam upon recording is $\lambda$ and that the refractive index of the substrate is n, the groove depth of the grooves is set in the vicinity of $\lambda/10n$.

12. The optical disk as defined in claim 2, wherein supposing that the wavelength of a light beam upon recording is $\lambda$ and that the refractive index of the substrate is n, the groove depth of the grooves is set to not less than $\lambda/3n$.

13. The optical disk as defined in claim 2, wherein a magneto-optical recording layer including a magnetic layer is formed on the substrate.

14. The optical disk as defined in claim 13, wherein the magnetic layer is constituted of a reproducing magnetic layer and a recording magnetic layer.

15. The optical disk as defined in claim 2, wherein a phase-change-type recording layer is formed on the substrate.

16. An optical disk apparatus, which uses an optical disk comprising: grooves and lands serving as recording tracks on which information is recorded, each of the grooves and lands being formed on a substrate in a manner so as to be alternately aligned in the radial direction, and provided with an address region that is formed with a leading portion at the same angular position, wherein: the address region is provided with a winding region in which a first recording track, which corresponds to either the grooves or the lands, has two side walls that wind in accordance with address information, and the width of the first recording track in the radial direction is set virtually constant, comprising:

light-beam applying means for applying a light beam to the optical disk;

light-beam receiving means for receiving a light signal from the optical disk; and first address-reproducing means for reproducing information in accordance with a signal from the light-beam receiving means and for detecting winding of the side walls of the first recording track by detecting a tracking error signal while the light beam is following the first recording track, so as to reproduce the address information in the first recording track.

17. The optical disk apparatus as defined in claim 16, further comprising a second address-reproducing means which, supposing that the recording track that corresponds to the other of the lands and grooves is a second recording track, detects the winding of the side walls of the second recording track by detecting a tracking error signal while a light beam is following the second recording track, thereby reproducing address information of the second recording track.

18. The optical disk apparatus as defined in claim 17, wherein: the second address-reproducing means comprises a distinct-portion detection means for detecting a distinct portion at which the two side walls of the second recording track have different shapes while the light beam is following the second recording track, and based upon the results of the detection by the distinct-portion detection means, address information of the second recording track is reproduced.

19. The optical disk apparatus as defined in claim 18, wherein the second address-reproducing means comprises:

coincident-portion signal detection means for obtaining a coincident-portion signal that corresponds to the winding of the side walls in a coincident portion at which the two side walls have the same shape, while the light beam is following the second recording track; and address-information combining means which, assuming that all possible signals from the distinct portion are signals of the distinct portion, generates a plurality of assumed signals by adding the signals to the coincident-portion signal, and selects one of the plurality of the assumed signals based upon a predetermined rule, so as to form address signal for the second track.

20. The optical disk apparatus as defined in claim 19, wherein: the address information of the second recording track of the optical disk is set to be identical to the address information of either of the two adjacent first recording tracks, and a first error-detection means which makes a judgement that a reading error exists when, among the plurality of the assumed signals, no signal is coincident with the address information of either of the adjacent first recording tracks that is supposed to be identical thereto, is installed.

21. The optical disk apparatus as defined in claim 19, wherein: the number of the distinct portions in the second recording track of the optical disk is set to a predetermined value, and a second error-detection means, which makes a judgement that a reading error exists when the number of the distinct portions existing within the address information of the second recording track, detected by the second address-reproducing means, is not coincident with the predetermined value, is installed.

22. The optical disk apparatus as defined in claim 16, wherein the light beam, applied from the light-beam applying means, has a light beam whose light spot on the optical disk is set to be greater than the width of the first recording track in the radial direction and also to be smaller than two times the width of the first recording track in the radial direction.

* * * * *